Figure 1:
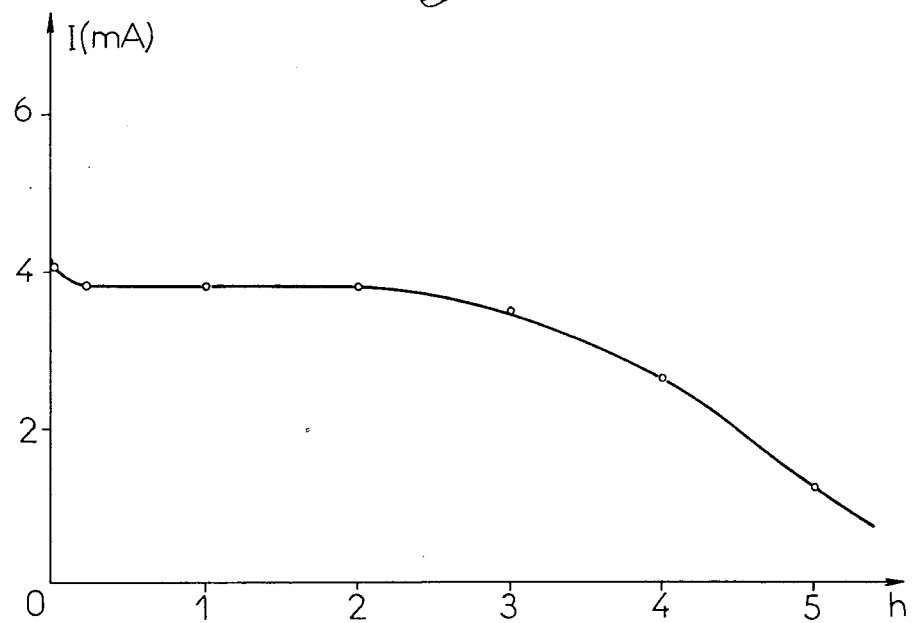

United States Patent [19]

Percheron born Guegen et al.

[11] 4,107,405
[45] Aug. 15, 1978

[54] ELECTRODE MATERIALS BASED ON LANTHANUM AND NICKEL, AND ELECTROCHEMICAL USES OF SUCH MATERIALS

[75] Inventors: Annick Percheron born Guegen, Paris; Jean Claude Achard, Kremlin-Bicetre; Jean Loriers, Meudon; Maurice Bonnemay, Boulogne-Billancourt; Guy Bronoël, Versailles; Joël Sarradin, Elancourt; Louis Schlapbach, Versailes, all of France

[73] Assignee: Agence Nationale de Valorisation de la Recherche (ANVAR), Neuilly sur Seine, France

[21] Appl. No.: 688,537

[22] Filed: May 21, 1976

[30] Foreign Application Priority Data

May 23, 1975 [FR] France .......................... 75 16160

[51] Int. Cl.² ........................................... H01M 10/24
[52] U.S. Cl. .................................. 429/218; 429/220; 429/223; 75/170
[58] Field of Search .................. 429/218, 223, 220, 27, 429/40; 75/170; 252/519

[56] References Cited

U.S. PATENT DOCUMENTS

| | | | |
|---|---|---|---|
| 3,311,502 | 3/1967 | Carson, Jr. | 429/223 |
| 3,405,008 | 10/1968 | Dilworth et al. | 429/42 |
| 3,850,694 | 11/1974 | Dunlop et al. | 429/27 X |
| 3,874,928 | 4/1975 | Will | 429/223 X |
| 4,004,943 | 1/1977 | Boter | 429/59 |

FOREIGN PATENT DOCUMENTS 2,003,749  7/1970  Fed. Rep. of Germany.

*Primary Examiner*—Anthony Skapars
*Attorney, Agent, or Firm*—Larson, Taylor and Hinds

[57] ABSTRACT

The invention relates to electro materials based on lanthanum and nickel having a formula close to $LaNi_5$ in which one of the components is partially substituted by a metal selected from those in groups Ia, II, III, IV and Va of the periodic table of elements, and other than lanthanides, in an atomic proportion which is not zero, being higher than 0.1% and lower than 25%, and preferbly from 0.5% to 15% with respect to the lanthanum.

38 Claims, 2 Drawing Figures

ELECTRODE MATERIALS BASED ON LANTHANUM AND NICKEL, AND ELECTROCHEMICAL USES OF SUCH MATERIALS

The invention concerns electrode materials based on lanthanum and nickel, and the electrochemical uses of such materials, in particular their use for making hydrogen electrodes for energy accumulators, particularly for accumulators of the alkaline electrolyte type.

One of the essential characteristics of reversible electrochemical cells used as energy accumulators lies in the energy-to-weight ratio, which expresses the amount of energy capable of being stored upon charging and restored upon discharging, per unit of weight of the accumulator. A low energy-to-weight ratio limits the possible uses of the accumulators. Thus, the extension of electrical traction for automobile vehicles is restricted by the poor characteristics of the conventional lead and cadmium-nickel accumulators, in which the energy-to-weight ratio is of the order of 35 Wh/kg. Electrochemical couples of the air-zinc or sodiumsulphur type, inspite of having a high electromotive force, still suffer from an insufficient energy-to-weight ratio as the substantial weight of electrolyte which is necessary for operation of the cells reduces the overall energy-to-weight ratio. In contrast, in fuel cells whose operating principle is based on the reversible decomposition of water itself, the mass of electrolyte is substantially lower than that of the active materials of the electrodes, and in most cases the electrolyte weight is only a minor part of the factors influencing the overall energy-to-weight ratio of the cell.

Accordingly, it will be appreciated why the use of materials having good hydrogen-retention properties can be of such interest, for making up hydrogen electrodes for accumulators. It can be shown moreover that, in an accumulator based on the oxygen-hydrogen couple and comprising a conventional air cathode, the energy-to-weight ratio is substantially determined by the capacity in relation to weight of the negative hydrogen electrode.

It is also important to use materials whose performance is satisfactory, particularly when such materials are used in accumulators which are required to operate at temperatures higher than ambient temperature.

The object of the present invention is electrode materials based on lanthanum and nickel, having a high hydrogen-retention capacity and a reduced charge loss at a temperature higher than ambient temperature, which materials are capable of improving the performances of accumulators by increasing the capacity in relation to weight of the hydrogen electrodes and therefore the energy-to-weight ratio of the accumulator assembly, even if the electromotive force is relatively low, as is the case in respect of the oxygen-hydrogen couple.

Indeed, it has already been envisaged that an intermetallic compound of lanthanum and nickel, having the formula, $LaNi_5$, can be used in forming electrodes; the retention capacity in respect of hydrogen contained in gaseous atmospheres is moreover already known for such a compound. However, the hydrogen-retaining properties observed in circumstances of use in which the hydrogen is in a gaseous atmosphere, and in the absence of electrolytic phenomena, are not retained totally intact in electrochemical uses, particularly under circumstances where the retention of hydrogen is effected in contact with a liquid medium. Thus, the capacity in relation to weight of an alkaline electrolyte cell comprising a hydrogen electrode based on the binary intermetallic compound $LaNi_5$ is not in conformity with that capacity in relation to weight which would be expected on a theoretical basis, having regard to the hydrogen-retention capacity of that alloy in a gaseous atmosphere under a pressure of one bar. Moreover, the charge loss observed with such electrodes at elevated temperature is substantial and limits the possible uses of such electrodes.

Now, the applicants have found that the specific capacity and the behaviour in dependence on temperature of the metallic alloys of this type could be very largely influenced by partial substitution of the component elements of the alloy. Essentially, by such a substitution, the invention aims to improve the specific capacity of such alloys in an electrochemical medium, and equally the group of properties which make a material useful for forming negative hydrogen electrodes and promote an improvement in the performances of the accumulators in which such electrodes can be employed; an electrode material based on lanthanum and nickel, in accordance with the invention, has a formula close to $LaNi_5$ in which one of the components is partially substitued by a metal selected from those in groups Ia, II, III, IV and Va, of the periodic table of elements, and other than lanthanides, in an atomic proportion which is not zero, being higher than 0.1% and lower than 25% and preferably from 0.5% to 15%, with respect to the lanthanum.

Thus, the substituent metal, namely M, can be selected in particular from the elements in groups II, III and IV. In these definitions, it will be appreciated that group II of the periodic table covers both elements in group IIa and those in group IIb and, likewise, group IV covers groups IVa and IVb, although group IVa is preferred for carrying out the invention. As regards the elements in group III, which are used as a substituent metal in the alloy according to the invention, they also comprise those of groups IIIa and IIIb, including yttrium, but excluding lanthanides. Moreover, the preferred substituent metals are those whose atomic radius is not considerably larger than that of lanthanum.

In accordance with another aspect of the invention, for producing a negative electrode having on the one hand a substantial capacity at temperatures which can be markedly higher than ordinary temperature, and on the other hand not suffering from a reduced charge loss in particular at elevated temperature, the nickel in the formula $LaNi_5$ can also be partially substituted by copper or chromium, in an atomic proportion of from 10% to 30% with respect to the nickel. This second substituent, namely M', is therefore present, in the overall formula of the alloy, in a substantial proportion relative to the first substituent M which is present in a small proportion.

In accordance with another aspect of the invention, in particular for the purposes of electrochemical uses, the above-mentioned materials are formed of alloys which are sub-stoichiometric in respect of nickel.

In accordance with yet another aspect of the invention, in particular for improving the maintenance of the capacity of the electrode in accordance with temperature, the above-mentioned materials comprise at their surface compounds which are capable of retarding desorption of the adsorbed hydrogen.

In accordance with a preferred embodiment of the invention, the electrode material comprises a ternary alloy having the formula:

$$La_x Ni_y M_z \qquad (I)$$

in which
x is from 0.8 to 1.1,
y is from 4.5 to 5.2,
z is from 0.01 to 0.2, and
$x + y + z$ is from 5.6 to 6.3,
M being the substituent metal.
Preferably, in this formula,
x is from 0.9 to 1.05,
y is from 4.7 to 5,
z is from 0.01 to 0.1.

Preferred substituent metals, that is to say forming the metal M of the above formula, are calcium, magnesium, zirconium barium and in particular titanium.

It should be noted that the substituent which is present in a small proportion, denoted by M in the above formula (I), such as more particularly titanium, can be a substitute for nickel as well as for lanthanum in the formula of the alloy.

The alloys as defined above have a high specific electrochemical capacity. This characteristic generally has values at least of the order of 0.2Ah/g. By virtue of its electrochemical properties, such an alloy is capable of forming a particlarly attractive material for a hydrogen electrode.

Moreover, more substantial substitution of the nickel by copper or chromium in these alloys makes it possible to improve the properties of the alloys at temperatures higher than ordinary temperature. This can be of advantage, in particular for accumulators which are required to operate at temperatures higher than ordinary temperature, even if this improvement is obtained at the expense of the energy-to-weight ratio in the cold condition. A quaternary alloy for forming an electrode material according to the invention preferably has the following formula:

$$La_x Ni_{(y-u)} M'_u M_z \qquad (II)$$

is which x, y, z and M are as defined above, M' is copper or chromium, and u is from 0.5 to 1.5 and preferably of the order of 1.

Generally, the above-mentioned ternary or quaternary alloys, which contain titanium as the substituent M, have remarkable properties as regards hydrogen retention and maintenance of capacity according to temperature. These alloys containing titanium form novel products and as such are included within the scope of the present invention.

For the purposes in particular of electrochemical uses, alloys forming the electrode materials of the invention are advantageously substoichiometric in respect of nickel.

The properties of the electrode materials of the invention, in particular their hydrogen retention at temperatures higher than ambient temperature, are further improved when these materials comprise on their surface compounds which, while permitting hydrogen to pass during cathodic charging, retard desorption of the absorbed hydrogen.

Such compounds include metals having a high overvoltage with respect to hydrogen such as copper and in particular cadmium, or ions which can be adsorbed on the surface of the materials of the invention, inhibiting then the recombination of hydrogen and thereby its desorption, such as antimony ion.

The invention also concerns the use of the abovementioned materials as components for forming a negative electrode for an electrochemical energy accumulator.

Therefore, the invention has inter alia as its object a hydrogen electrode which comprises such mterials and in particular a material comprising an alloy corresponding to formula I or II above. Not only do these electrodes make it possible to increase the energy-to-weight ratio of the accumulators but in addition the alloys according to the invention have the advantage of being substantially insensitive to alkaline aqueous electrolytes, in contrast to the situation for example of alloys based on lanthanum and cobalt. Generally, their electrochemical properties contribute to an improvement in particular in the performance of accumulators of the alkaline electrolyte type.

In order to further improve such performances according to another embodiment of the invention, an alkaline concentrated electrolyte will be used, when charging the electrodes, normality of whch is exceeding some 5 – 6 N and is advantageously of about 12 N.

The charging ability of such electrodes is thus substantially increased.

The alloy employed in these uses is advantageously in the form of a powder having a grain diameter of less than 100 microns and preferably less than 50 microns. This powder can be shaped by any conventional method. By way of example, it can be maintained by compression in contact with nickel forming the conducting part of the electrode, or it can be agglomerated by an organic binder, or by compression and sintering.

The alloys according to the invention can be prepared by any known method. Preferably, the components of the alloy are mixed in the molten state, in particular at a temperature of from 1350° to 1550° C, the mixture is cooled to solidify it, possibly down to ambient temperature, and the mixture is subjected to a reheating operation at a temperature that is advantageously from 600° C to 1300° C. The first stage of melting and mixing is effected in a cooled crucible so as to prevent the alloy being contaminated in the course of manufacture thereof, by the components of the crucible itself; this therefore prevents any deterioration in the properties of the alloy, which could arise for example due to aluminium diffused from an aluminium crucible at a high temperature. To produce a powder which is tuited for being used in forming a hydrogen electrode, the re-heated alloy produced can be crushed and then reduced to fine powder by a plurality of successive cycles of hydrogenation and dehydrogenation, the hydrogenation operation being effected by contact with hydrogen in gaseous phase under pressure.

Figure 2:
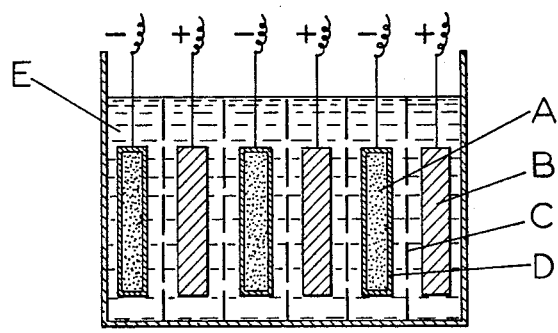

Particular non-limitative examples of carrying out the invention will now be described, concerning the preparation of the alloys used as electrode material, and the use thereof in electrochemical accumulators. In these examples, reference will be made to FIGS. 1 and 2 in which:

FIG. 1 shows the discharge curve obtained with a particular alloy,

FIG. 2 diagrammatically shows an accumulator having a negative electrode comprising such an alloy.

EXAMPLE 1

To prepare an alloy having the formula:

$La_{0.8}Ti_{0.2}Ni_5$ the three components nickel, lanthanum and titanium are mixed by being melted together. These components in powder form are introduced in stoichiometric amounts (1.862 g of lanthanum, 0.169 g of titanium and 5.179 g of nickel) into a cooled copper crucible. They are heated under vacuum ($5.10^{-6}$ torr) by direct high-frequency induction, to a temperature of 1550° C, and held at that temperature for 2 minutes. After cooling to ambient temperature, the ingot of material is returned and a fresh melting operation is carried at 1550° C. It is then reheated at 800° C for 3 days.

Alloys having the following formula are prepared by the same process:

$La_{0.95}Ti_{0.05}Ni_5$ $La_1Ti_{0.05}Ni_{4.95}$

By crystallographic examination, it is found that the resulting alloys preserve a lattice of the type $CaCu_5$.

For the purposes of manufacturing electrodes, these alloys are subjected to a plurality of hydrogenation operations in a solid-gas medium. This treatment increases the level of reactivity and makes it possible to obtain a fine powder (from 5 to 10 $\mu$).

The ingot of alloy is coarsely crushed in an argon atmosphere. The pieces of crushed alloy, which are a few millimeters in diameter, are introduced into an autoclave. After the air has been removed from the autoclave, hydrogen is admitted at a pressure of the order of 100 bars and the autoclave is raised to a temperature of 60° C. The period of time necessary for maximum adsorption in this first hydrogenation operation is from a few minutes to half an hour. The autoclave is then evacuated again, and then fresh hydrogen is introduced. Desorption and adsorption of hydrogen are then very rapid. The treatment is repeated three or four times.

EXAMPLE 2

An alloy having the formula:

$La_{0.98}Ca_{0.02}Ni_5$ is prepared by mixing the components in stoichiometric proportions by melting at 1380° C, operating as described above in Example 1 and preventing any vaporisation of the calcium. After cooling, the ingot of alloy is returned and re-melted under the same conditions, until a homogenous ingot of material is obtained. It is reheated in an inert atmosphere at a temperature of 600° C for a period of 3 days, to complete homogenisation.

The resulting ingot of material is crushed and subjected to successive cycles of hydrogenation and dehydrogenation, as described in the previous Example, until it has been reduced to the state of a powder in which the grain diameters are of the order of from 5 to 10 microns.

Alloys having the formula:

$La_{0.95}Ca_{0.05}Ni_5$ $La_{0.95}Ba_{0.05}Ni_5$ are prepared by the same process.

EXAMPLE 3

Using the same process as that set out in Example 1, but with the addition of a fourth constituent, alloys having the following formula are prepared:

$La_{0.95}Ni_4CuTi_{0.05}$ $LaNi_4CuTi_{0.02}$ $LaNi_4CrTi_{0.02}$

EXAMPLE 4

The specific electrochemical capacities of alloys prepared in accordance with the preceding Examples and used as components for a hydrogen electrode are determined by reference to the curve representing current discharge versus time.

In each case, 50 mg of the material in powder form are charged in an aqueous potash solution which is concentrated five times normal, with a current of 1.5 mA for a period of 16 hours at ordinary temperature (23° C). The discharge is then studied by applying to the electrode a potential of $-1$ V/ECS. The potential assumed by the electrode after charging is generally of the order of $-1170$ mV/ECS. The amounts of hydrogen stored and then consumed are determined by integrating the curve in respect of discharge $I = f(t)$, limited to current values of 0.5 mA, namely about 10% of the initial current. They are expressed in mAh, but the results can possibly be converted since it is known that a hydrogen atom corresponds to 27 Ah.

Whereas, under these conditions, the specific capacity of the binary alloy $LaNi_5$ does not exceed values of the order of 315 mAh/g, the values obtained for the ternary alloys of the invention can reach 340 mAh/g.

Moreover, no corrosion of the material by the electrolyte is found.

The highest capacities are obtained for alloys whose formula contains about 0.02 atoms of substituent metal, while lanthanum and nickel remain present in proportions corresponding to the stoichiometry of $LaNi_5$, to within 0.05 atom. In addition, the best substituent is titanium.

By way of example, there are illustrated below the specific capacities measured as set out above, for the following alloys:

| | |
|---|---|
| $La_{0.98}Ti_{0.02}Ni_5$ | 330 mAh/g |
| $La_{0.95}Ti_{0.05}Ni_5$ | 330 mAh/g |
| $La_1Ti_{0.05}Ni_{4.95}$ | 340 mAh/g. |

The above value relates to a slow charge rate.

For a rapid charge rate, with a current of 10 mA for a period of 2 hours, a specific capacity of 300 mAh/g for the alloy $La_{0.98}Ti_{0.02}Ni_5$ for example is obtained.

EXAMPLE 5

The specific capacity of quaternary alloys having the formula $La_{0.95}Ni_4CuTi_{0.05}$ is determined as described above in Example 4, but with charge and discharge being effected at 40° C. The values obtained for a rapid charging rate are given below, and also, by way of comparsion, the values obtained with an alloy $LaNi_5$:

|  | Alloy of the invention | LaNi$_5$ |
|---|---|---|
| at 40° C | 210 mAh/g | 100 mAh/g |

Study of these results clearly shows the excellent performance of the alloys forming the electrode materials of the invention, at temperatures higher than ambient temperature. These materials, in contrast to the known alloys LaNi$_5$ can therefore be used at elevated temperatures in cells or accumulators.

EXAMPLE 6

The alloy under study has the following formula:

$$La_{0.98} Ni_5 Ti_{0.02}$$

Its polarisation characteristics are studied under the same electrochemical conditions as those set out in Example 4. The curve representing current discharge (in mA) versus time (in hours) at a temperature of 23° C is illustrated in FIG. 1.

It is found that this curve has a very marked plateau, which is an attractive characteristic for an accumulator electrode. The value of the discharge current at the plateau is 4 mA for an applied potential of $-1$ V/ECS. This is for a weight of alloy powder of 50 mg in which the grains have diameters of the order of 50 microns.

Taking account of the density of the powder, it is possible to employ at least 750 mg of the alloy per square centimeter; under these conditions, the discharge current, for the same degree of polarisation, is 60 mA/cm$^2$, which is a substantial current density.

Upon cathodic charging by a current of 1.5 mA (for 50 mg of material) the potential at the end of the charge reaches a value of the order of 1.25 V/ECS. For recharging at very high current densities (10 mA for 50 mg of material), this potential is of the order of 1.35 V/ECS. It is therefore found that, in a wide range of charging current densities, the electrical efficiency remains very high (1/1.3 = 0.77).

The above indicated data show that a substantial charging rate can be applied (150 mA/cm$^2$). Indeed, for many uses, it is useful that it is possible to envisage carrying out charging operations in very short periods.

EXAMPLE 7

FIG. 2 diagrammatically shows an accumulator which is made by using, to form the negative electrode, a material which is in accordance with the invention and which is produced by melting and reduced to powder by successive cycles of hydrogenation and dehydrogenation in gaseous phase.

So as to be formed into electrodes, this powder can be placed in perforated nickel-plated steel or nickel tubes or small pockets of sintered nickel. In both cases, the powder is held in compression, which provides for maintaining a good degree of conductibility of the material, while preventing excessive de-aggregation. It is also possible to form an electrode by mixing the powder with a polymer whose cross-linking provides for cohesion of the assembly; in this case, the powder-polymer ratio is so selected that the electronic charges can be easily drained from the grains arranged at the surface of the electrode to its centre at which there is a nickel grille acting as a collector.

These modes of using the electrode powders are conventional per se. It is also possible to envisage consolidation of the electrodes by compression and sintering of the powder or fixing the powder on a nickel grille acting as a collector by means of polytetrafluoroethylene which is initially in the form of an emulsion.

FIG. 2 shows by way of example the powder A contained in a nickel tube or pocket D, for each anode.

Each negative electrode is separated from the adjacent positive electrodes by a separator C. The electrolyte E is an alkaline aqueous electrolyte, in particular of potash in five times normal concentration.

The positive electrodes are formed by nickel oxide B and are made in accordance with those used in normal Cd-Ni accumulators. it is also possible to envisage the positive electrodes being silver oxide electrodes corresponding to those used in silver-zinc accumulators.

In order to prevent at best hydrogen desorption such accumulators will advantageously be submitted to a pressure. Such pressure should preferably not exceed 20 bars.

In a modified form, the electrodes according to the invention can be associated with conventional air cathodes whose active material is divided carbon and which can carry an anodic charge while retaining attractive characteristics when operating as a cathode, which implies a reduction in oxygen. For example, it is possible profitably to use the air electrodes disclosed in French patent application No. 73 22182 published under the number 2 236 281.

The energy-to-weight ratio of an accumulator constructed as described above is of the order of 150 Wh/kg.

EXAMPLE 8

Taking an electrode formed of a material based on an alloy La Ni$_{4.95}$ Ti$_{0.05}$, which is prepared in accordance with Example 1, there is deposited on the electrode a thin film of cadmium, in particular by electrolysis or by distillation of the cadmium on the alloy powder for example in a tantalum crucible. The amount of cadmium used does not generally exceed 5% by weight of the electrode, this being so as to allow the hydrogen to pass upon cathodic charging.

For a slow charging rate, the specific capacity of the electrode which is not covered with cadmium, at 34° C is 60 mAh/g and, when the electrode has a thin cadmium film, the specific capacity is 130 mAh/g.

The substantial improvement achieved by effecting a surface treatment of the electrode is therefore appreciated.

EXAMPLE 9

The specific capacity of the electrodes according to the invention, is measured at 22° C in an accumulator containing, as an electrolyte, 12 N Potash.

An electrode of the pocket type, containing La Ni$_{4.7}$ Ti$_{0.02}$ is used as a negative electrode, polytetrafluoroethylene being the binding material.

The accumulator will be charged at a rate of about C/5, i.e. enabling the accumulator capacity to be reached within some 5 hours. Recharging operation is carried out under the same conditions.

Another trial is carried on but in using 5N potash.

The following corresponding specific capacities have been measured for the electrodes according to the invention:

- 250 mAh/g in 12 N KOH
- 160 mAh/g in 5 N KOH.

The study of these results shows that the charging ability of the electrodes according to the invention is substantially improved by the use of a concentrated electrolyte.

We claim:

1. An electrochemical energy accumulator of the alkaline electrolyte type including a negative electrode based on lanthanum and nickel, said negative electrode comprising an alloy corresponding substantially to the formula LaNi$_5$ in which one of the components La and Ni is partially substituted by a metal M selected from those in groups Ia, II, III, IV and Va of the periodic table of elements and other than lanthanides, in an atomic proportion which is higher than 0.1% and lower than 25%.

2. An accumulator according to claim 1 wherein said atomic proportion of said metal is from 0.5% to 15% with respect to the lanthanum.

3. An accumulator according to claim 1, wherein nickel is partially substituted by copper or chromium, in an atomic proportion of from 10% to 30% with respect to the nickel.

4. An accumulator according to claim 1, wherein said alloy is sub-stoichiometric in respect of nickel.

5. An accumulator according to claim 2, wherein said alloy is sub-stoichiometric in respect of nickel.

6. An accumulator according to claim 1, further comprising on at least a part of its surface, at least one material which makes it possible to reduce the loss of the absorbed hydrogen under the effect of the heat, said material comprising a film of a metal having a high overvoltage relative to hydrogen and/or ions which can be adsorbed on the surface of the electrode material which ions inhibit the recombination of hydrogen and thereby its desorption.

7. An accumulator according to claim 6, wherein said film comprises copper or a cadmium metal.

8. An accumulator according to claim 6, wherein said ions comprise antimony ions.

9. An accumulator according to claim 1, which comprises a ternary alloy having the formula:

$$La_x Ni_y M_z$$

in which
x is from 0.8 to 1.1
y is from 4.5 to 5.2,
z is from 0.01 to 0.2, and
x + y is from 5.6 to 6.3.

10. An accumulator according to claim 1, which comprises a ternary alloy having the formula:

$$La_x Ni_y M_z$$

in which
x is from 0.9 to 1.05,
y is from 4.7 to 5,
z is from 0.01 to 0.1

11. An accumulator according to claim 1, characterized in that it comprises a quaternary alloy having the formula:

$$La_x Ni_{(y-u)} M'_u M_z$$

in which
x is from 0.8 to 1.1,
y is from 4.5 to 5.2,
z is from 0.01 to 0.2 and in which
M' is copper or chromium and u is from 0.5 to 1.5.

12. An accumulator according to claim 11, wherein u is about 1.

13. An accumulator according to claim 1, wherein said metal M is selected from calcium, magnesium, barium, zirconium and titanium.

14. An accumulator according to claim 2, wherein said metal M is selected from calcium, magnesium, barium, zirconium and titanium.

15. An accumulator according to claim 1, in the form of a powder having a grain diameter of less than 100 microns.

16. An accumulator according to claim 1, wherein said metal M is titanium.

17. An accumulator according to claim 1, comprising an aqueous concentrated electrolyte, whose normality exceeds 5 normal.

18. An accumulator according to claim 1, having an operating pressure not in excess of 20 bars.

19. An accumulator according to claim 1 wherein said metal M is selected from Group Ia of the periodic table of elements.

20. An accumulator according to claim 1 wherein said metal M is selected from Group II of the periodic table of elements.

21. An accumulator according to claim 1 wherein said metal M is selected from Group III of the periodic table of elements.

22. An accumulator according to claim 1 wherein said metal M is selected from Group IV of the periodic table of elements.

23. An accumulator according to claim 1 wherein said metal M is selected from Group Va of the periodic table of elements.

24. An electrode material suitable for use in forming a hydrogen electrode of an energy accumulator based on lanthanum and nickel, and comprising an alloy corresponding substantially to the formula LaNi$_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said nickel being partially substituted by copper or chromium, in an atomic proportion of from 10% to 30% with respect to the nickel.

25. An electrode material suitable for use in forming a hydrogen electrode of an energy accumulator based on lanthanum and nickel, and comprising an alloy corresponding substantially to the formula LaNi$_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said alloy being sub-stoichiometric in respect of nickel.

26. An electrode material according to claim 25 wherein the atomic porportion of said metal is from 0.5 to 15% with respect to the lanthanum.

27. An electrode material suitable for use in forming a hydrogen electrode of an energy accumulator based on lanthanum and nickel, and comprising an alloy corresponding substantially to the formula LaNi$_5$ in which one of the components La nd Ni is partially substituted by a metal M selected from those in groups Ia, II, III, IV and Va of the periodic table of elements and other than lanthanides, in an atomic proportion which is higher than 0.1% and lower than 25%, said material further comprising on at least a part of its surface, at least one material which makes it possible to reduce the loss of the absorbed hydrogen under the effect of the heat, said material comprising a film of a metal having a high overvoltage relative to hydrogen and/or ions which can be adsorbed on the surface of the electrode material which ions inhibit the recombination of hydrogen and thereby its desorption.

28. An electrode material according to claim 27, wherein said film comprises copper or a cadmium metal.

29. An electrode material according to claim 27, wherein said ions comprise antimony ions.

30. An electrode material suitable for use in forming a hydrogen electrode of an energy accumulator based on lanthanum and nickel, and comprising an alloy corresponding substantially to the formula $LaNi_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said material comprising a ternary alloy having the formula:

$$La_x Ni_y M_z$$

in which
 $x$ is from 0.8 to 1.1,
 $y$ is from 4.5 to 5.2,
 $z$ is from 0.01 to 0.2, and
 $x + y + z$ is from 5.6 to 6.3.

31. An electrode material according to claim 30, wherein said ternary alloy has the formula:

$$La_x Ni_y M_z$$

in which
 $x$ is from 0.9 to 1.05,
 $y$ is from 4.7 to 5, and
 $z$ is from 0.01 to 0.1.

32. An electrode material suitable for use in forming a hydrogen electrode of an energy accumulator based on lanthanum and nickel, and comprising an alloy corresponding substantially to the formula $LaNi_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said material comprising a quaternary alloy having the formula:

$$La_x Ni_{(y-u)} M'_u M_z$$

in which
 $x$ is from 0.8 to 1.1,
 $y$ is from 4.5 to 5.2,
 $z$ is from 0.01 to 0.2 and in which
 M' is copper or chromium and u is from 0.5 to 1.5.

33. An electrode material according to claim 27, wherein u is about 1.

34. An electrode material suitable for use in forming a hydrogen electrode of an energy accumulator based on lanthanum and nickel, and comprising an alloy corresponding substantially to the formula $LaNi_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said metal M being titanium.

35. An electrode material suitable for use in forming a hydrogen electrode of an energy accumulator based on lanthanum and nickel, and comprising an alloy corresponding substantially to the formula $LaNi_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said metal M being selected from Group III of the periodic table of elements.

36. An electrode material according to claim 25 wherein said metal M is selected from Group III of the periodic table of elements.

37. A hydrogen electrode comprising a material according to claim 25.

38. A process for preparing an alloy suitable for use in making a hydrogen electrode of an energy accumulator based on lanthanum and nickel, and comprising an alloy corresponding substantially to the formula $LaNi_5$ in which one of the components La and Ni is partially substituted by a metal M selected from those in groups Ia, II, III, IV and Va of the periodic table of elements and other than lanthanides, in an atomic proportion which is higher than 0.1% and lower than 25%, said process comprising mixing the components of the alloy in the molten state, at a temperature of from 1350° to 1550° C in a crucible cooled to prevent contamination of the alloy by the components of the crucible, cooling the mixture to cause it to solidify, and reheating the mixture at a temperature which is from 600° C to 1300° C.

* * * * *